Sept. 19, 1961     H. C. WINKEL ET AL     3,000,341
GROUP BURNING FIXTURE
Filed Aug. 20, 1956     6 Sheets-Sheet 1
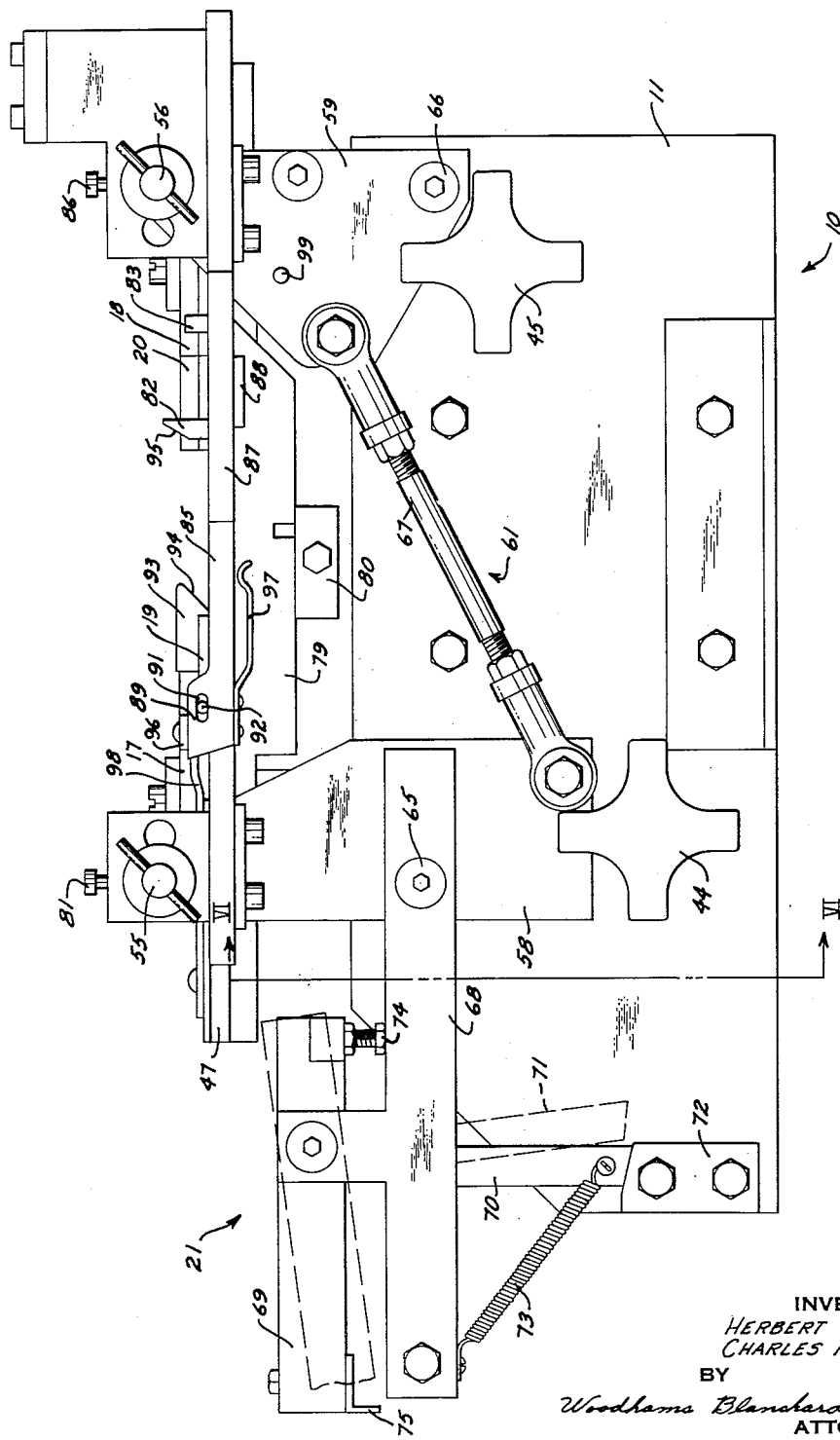
INVENTORS
HERBERT C. WINKEL
CHARLES H. McALPINE
BY
Woodhams Blanchard Flynn
ATTORNEYS

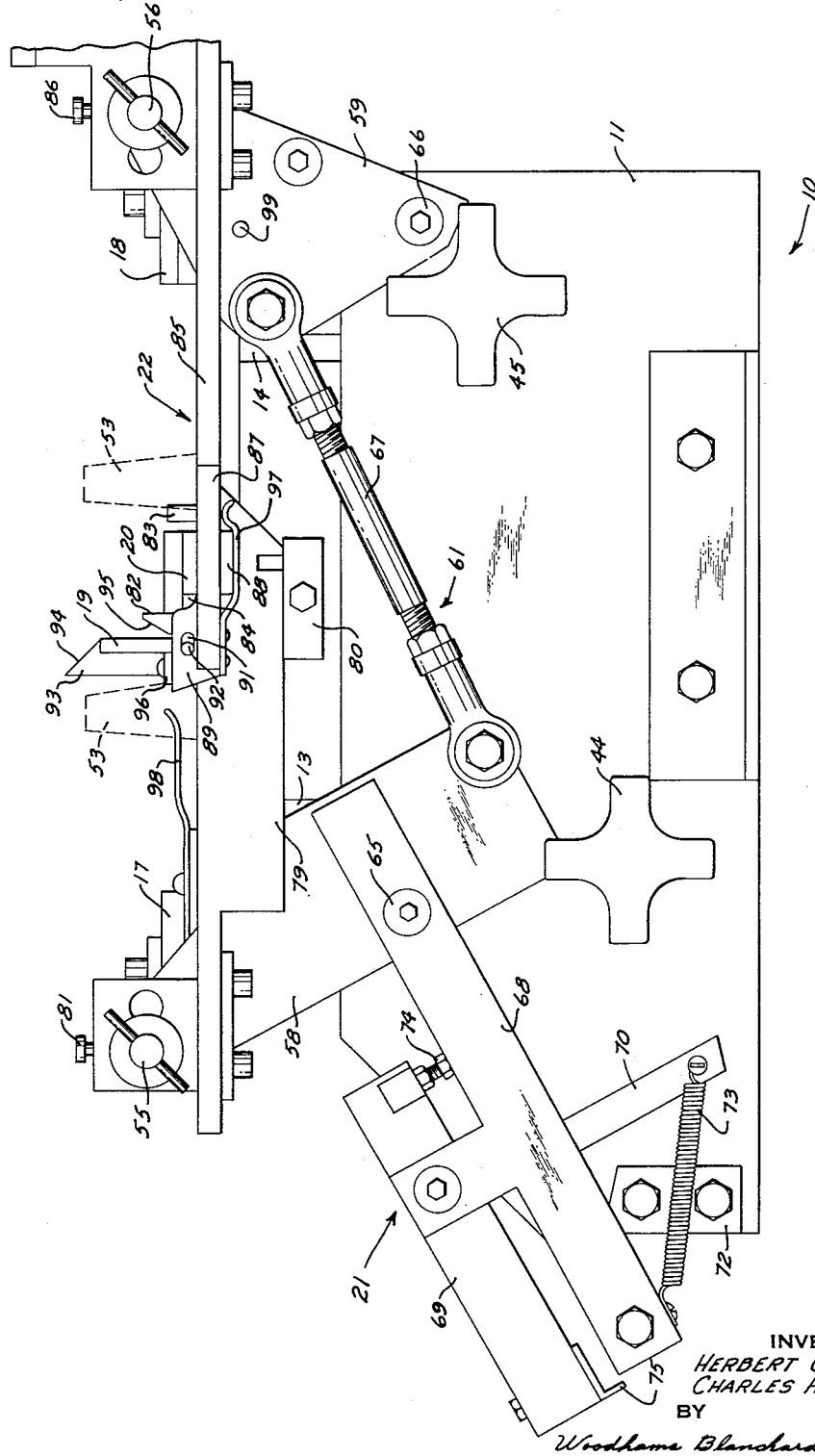

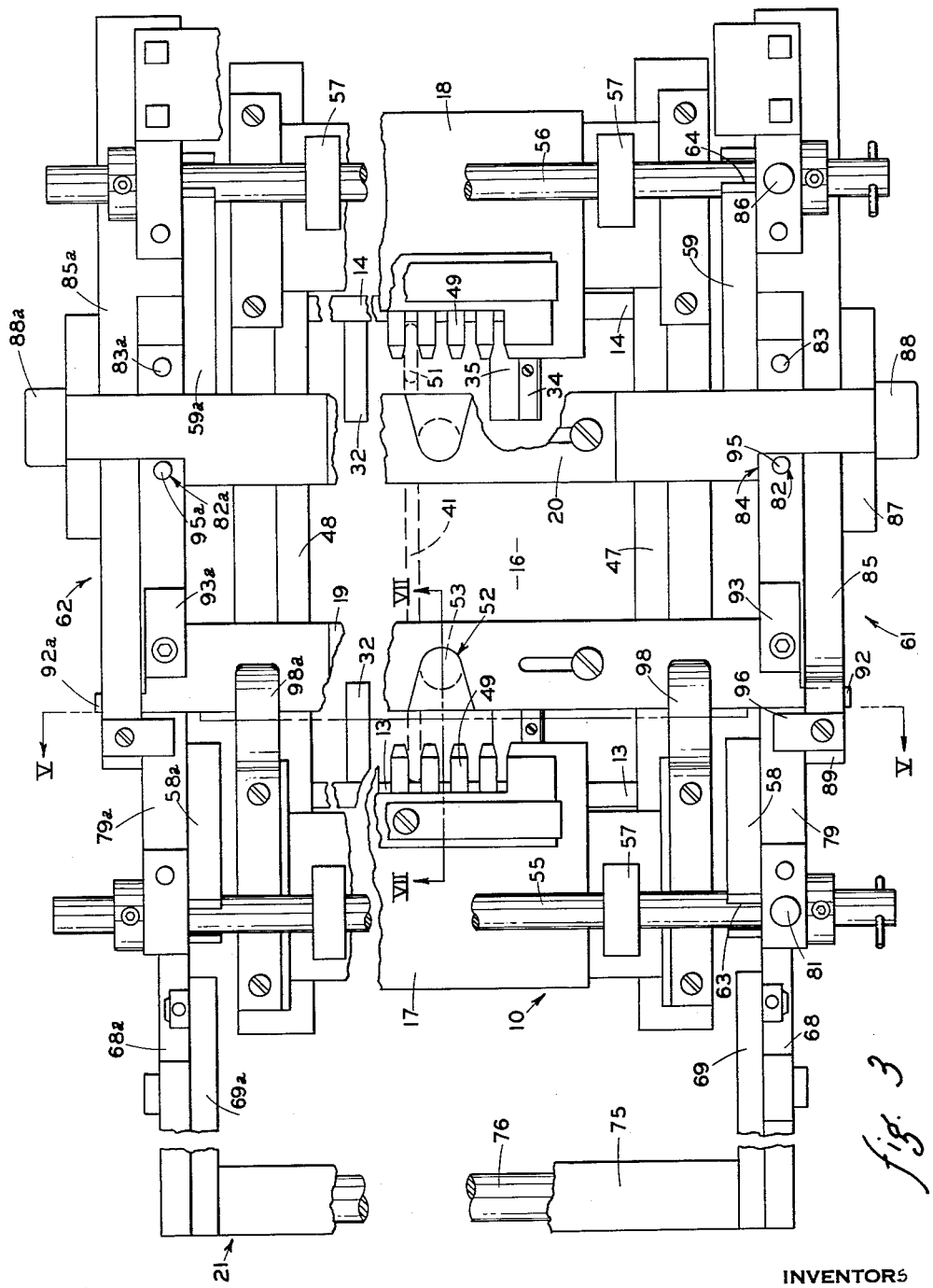

Sept. 19, 1961    H. C. WINKEL ET AL    3,000,341
GROUP BURNING FIXTURE
Filed Aug. 20, 1956    6 Sheets-Sheet 4
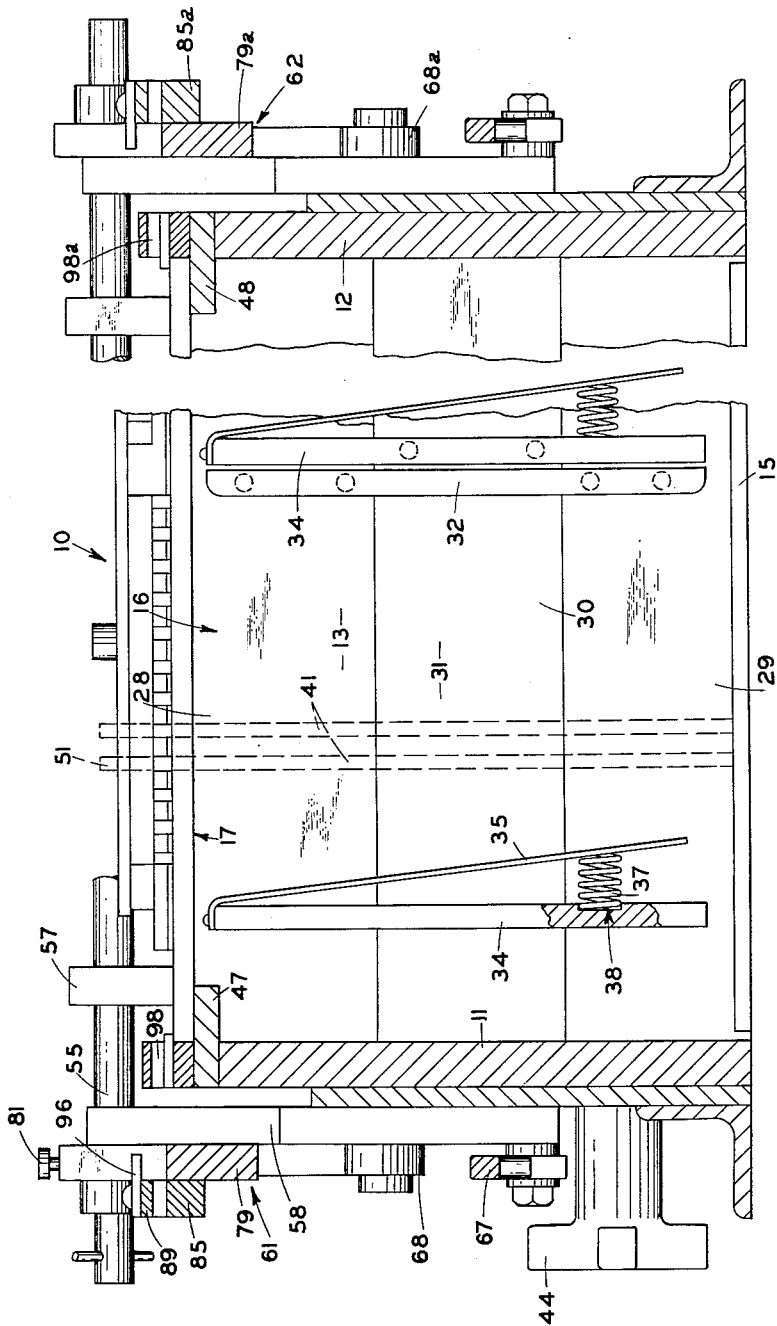
INVENTOR
HERBERT C. WINKEL
CHARLES H. McALPINE
BY
Woodhams Blanchard & Flynn
ATTORNEY

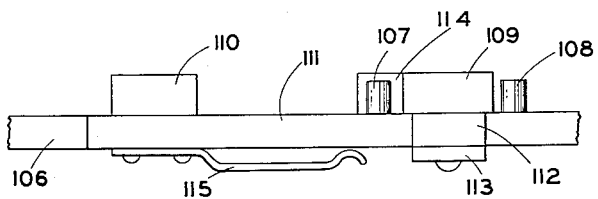
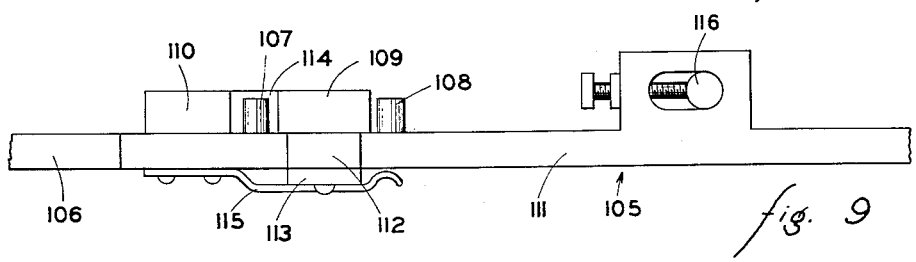
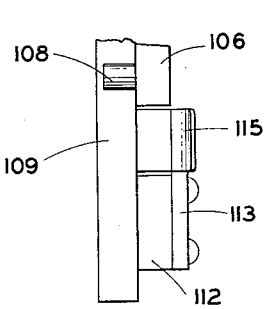
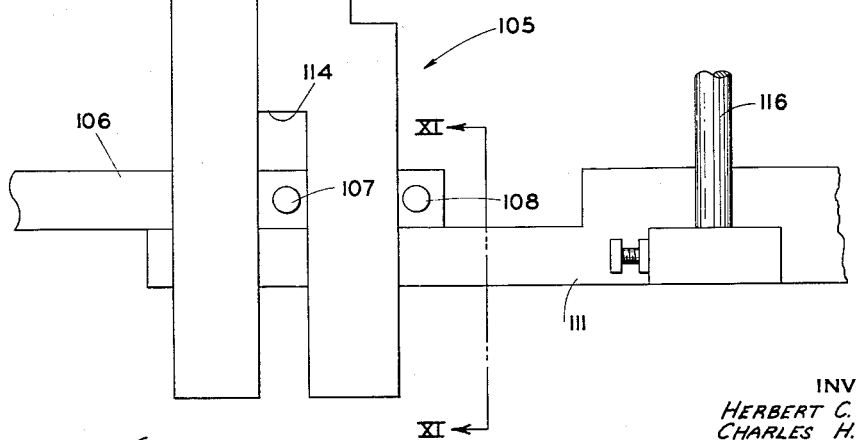

United States Patent Office 3,000,341
Patented Sept. 19, 1961

3,000,341
GROUP BURNING FIXTURE
Herbert C. Winkel, Watervliet, and Charles H. McAlpine, Coloma, Mich., assignors, by direct and mesne assignments, to Kalamazoo Manufacturing Company, Kalamazoo, Mich., a corporation of Michigan
Filed Aug. 20, 1956, Ser. No. 604,907
6 Claims. (Cl. 113—122)

This invention relates in general to a device, commonly referred to as a group burning fixture, for holding a plurality of storage battery plates in position with respect to each other while the lugs thereof are fused to each other as well as to a terminal post. More particularly, the invention relates to a fixture, of the same general type as that disclosed in the patent application Serial No. 275,357, now Patent No. 2,808,800, issued October 8, 1957, wherein the battery plates can be more easily loaded than was previously possible with machines of this general type, while maintaining the same high standards of battery production previously obtained with such machines.

In the manufacture of storage batteries, it is necessary to electrically connect a plurality of battery plates, such connection also serving to hold these plates in spaced relationship with respect to each other. It is common knowledge in the art that this step is accomplished by fusing the lugs of these battery plates together with a soft metal, such as lead, while simultaneously connecting a battery terminal post to the fused lugs. The patent applications Serial No. 232,215, now Patent No. 2,759,445, issued August 21, 1956, and Serial No. 275,357 describe and disclose two different types of fixtures whereby a plurality of groups of battery plates may be positioned while the above mentioned fusing operation is conducted, said fixtures also serving to contain and position both the fusing material and a terminal post with respect to the battery plate lugs during the fusing operation.

The structure of Serial No. 275,357 is an improvement over the invention of Serial No. 232,215 in that it permits the loading of battery plates into the fixture from the same, upper side thereof upon which the fusing operation is conducted thereafter. However, it was found that, in order to load or unload the fixture of Serial No. 275,357 with battery plates, certain parts of the fixture had to be raised away from the upper side of the fixture toward the operator, thereby obstructing the path of such loading or unloading.

Accordingly, the primary object of this invention has been the provision of a group burning fixture which can be easily loaded or unloaded through the same side thereof at which the fusing operation is conducted, thereby eliminating the necessity of rotating or otherwise moving the fixture and the battery plates therein between the loading and fusing steps, or between the fusing and unloading steps.

A further object of this invention has been the provision of a group burning fixture, as aforesaid, wherein said battery plates can be loaded into, and removed from, the fixture with a minimum of obstruction to such loading and unloading, as by eliminating the presence of any parts of the fixture in the path of said loading and unloading.

A further object of this invention is the provision of a group burning fixture, as aforesaid, having improved means for snugly but slidably and releasably holding a group of positive and negative battery plates in proper relationship with respect to each other during the burning or fusing process, such positioning means being easily and quickly adjustable and adaptable to groups containing different quantities of battery plates.

A further object of this invention is the provision of a group burning fixture, as aforesaid, which is sturdy in structure, easy to manipulate, foolproof and accurate in operation, and which requires little or no maintenance under normal operating conditions.

Other objects and purposes of this invention will become apparent to persons familiar with this type of equipment upon reading the following specification and examining the accompanying drawings, in which:

FIGURE 1 is an end elevation of a group burning fixture characterizing the invention and shown in the closed, burning position.

FIGURE 2 is an end elevation similar to that shown in FIGURE 1, but shown in the open, plate loading or unloading position.

FIGURE 3 is a broken, top plan view of said group burning fixture.

FIGURE 5 is a sectional view taken along the line V—V of Figure 3.

FIGURE 8 is a fragment of a top plan view of an alternate structure shown in a loading or unloading position.

FIGURE 9 is an end view of the structure appearing in FIGURE 8.

FIGURE 10 is an end view similar to that shown in FIGURE 9, but in a burning position.

FIGURE 11 is a sectional view taken along the line XI—XI of FIGURE 8.

For the purposes of convenience in description, the terms "front," "rear," and derivatives thereof, will have reference to those sides of the fixture toward and away from the operator, and namely to the left and right sides, respectively, of the fixture and parts associated therewith as appearing in FIGURES 1, 2 and 3. The terms "upper," "lower," and derivatives thereof, will have reference to the fixture in its normal operating position as appearing in FIGURES 1 and 2. The terms "right" and "left" will have reference to the lower and upper ends, respectively, of the fixture appearing in FIGURE 3. The terms "inner," "outer" and derivatives thereof, will have reference to the geometric center of the fixture and parts associated therewith.

General description

Figure 4:
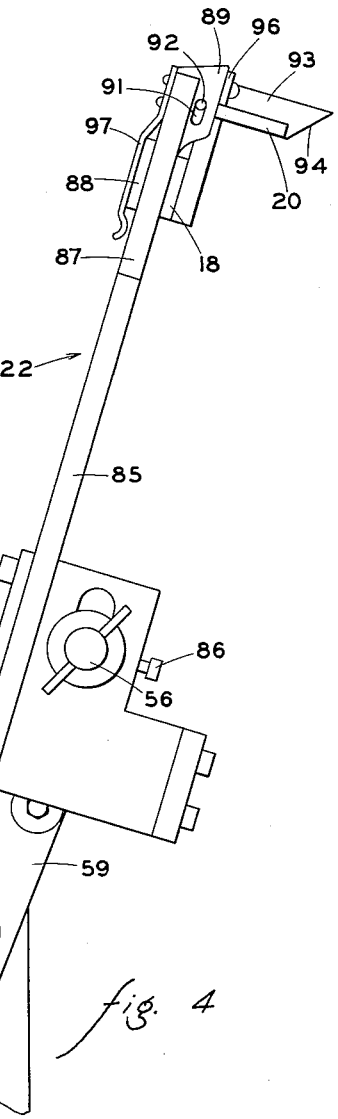
FIGURE 4 is a fragment of FIGURE 2 showing the lift mechanism thereof in the raised position.

As indicated in FIGURES 2, 3 and 5, the improved fixture, to which this invention relates, has a frame structure 10 including a right end wall 11, a left end wall 12 (FIGURE 5), a front wall 13, a rear wall 14 and a bottom wall 15, which define a battery plate chamber 16. A frame structure of the same general type is shown more completely in application Serial No. 275,357. As shown in FIGURES 3 and 5, the plate chamber 16 is open through the upper side thereof, except for the comb structures 17 and 18 and the post dam elements 19 and 20. While loading or unloading the fixture, these members and elements are moved away from positions obstructing the open upper side of the chamber 16 by actuating mechanism 21 (FIGURES 1 and 3) and by the hinged lift mechanism 22 (FIGURES 2, 3 and 4).

Detailed construction

As shown in FIGURES 2, 3 and 5, the frame structure 10 is substantially rectangular in shape and is preferably fabricated from rigid, heat resistant material, such as steel. The front and rear walls 13 and 14, respectively, are substantially identical and both have upper and lower, parallel spaced, guide plates 28 and 29, shown in FIGURES 5 and 6 with respect to the front wall 13. An intermediate plate 30 is slidably disposed parallel with, and between, said upper and lower plates for movement lengthwise thereof. Said upper and lower plates 28 and 29 are secured at their opposite ends to the end walls 11 and 12.

Figure 6:
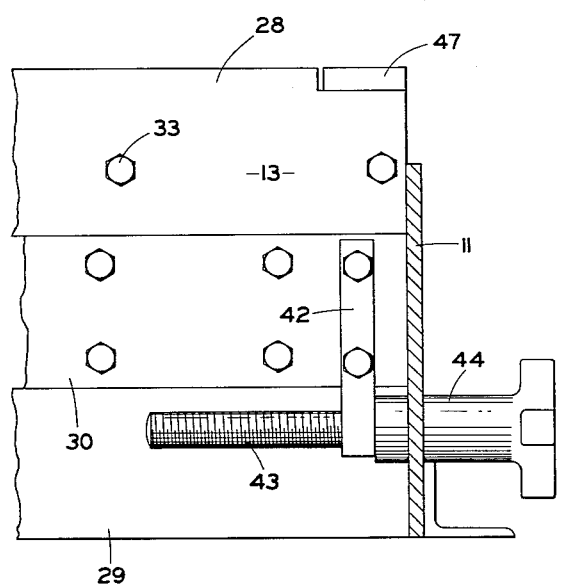
FIGURE 6 is a sectional view substantially as taken along the line VI—VI of FIGURE 1.

The chamber 16 (FIGURE 5) is divided into a plurality of group compartments 31 by means of spaced, cooperating pairs of fixed partition members 32 which are secured to the upper and lower plates 28 and 29 of the front and rear walls, as by means of the bolts 33 (FIGURE 6). Each pair of fixed partition members is substantially co-planar and disposed transversely of the chamber 16 at substantially equal intervals lengthwise thereof. A plurality of movable partition members 34 are also arranged in cooperating, aligned pairs which are rigidly secured to and movable with the intermediate plates 30 at intervals therealong substantially equal to the distance between the fixed partition members 32. One movable partition member 34 is provided to face and cooperate with each fixed partition member 32 along both the front and rear walls, as shown in FIGURE 5 with respect to the front wall. Inasmuch as the fixed and movable partition members in each pair are identical, only those partition members associated with the front wall 13 are shown in detail herein.

The movable partition members 34 are provided with elongated leaf spring members 35 (FIGURE 5) which are secured to the upper ends of the partition members 34 and diverge downwardly therefrom toward the corresponding fixed partition member 32. A coiled spring 37 has one end received into a recess 38 in the side of the movable partition member 34, the other end of said spring 37 being engaged by the leaf spring member 35. Thus, when a group of battery plates, two of which are shown in broken lines at 41 in FIGURE 5, is disposed between a pair of fixed and movable partition members, they will be snugly held in position by the spring member 35 and coiled spring 37.

A bar 42 (FIGURE 6) is secured to the outer surface of the intermediate plate 30 of the front wall 13 and is threadedly engaged by a screw 43 which extends through, and is rotatably supported upon, the right end wall 11. A handle 44 on the rightward end of the screw 43 (FIGURE 6) permits rotation of said screw 43, whereby the intermediate plate 30, and the movable partition members 34, mounted thereon, are moved lengthwise of the frame structure 10. A similar adjustment mechanism, including the handle 45 (FIGURES 1 and 2), is provided for adjusting the position of the corresponding intermediate plate on the rear wall 14.

A pair of guide rails 47 and 48 (FIGURES 3 and 5) are mounted upon the upper edges of the right and left end walls 11 and 12, respectively, for slidably supporting the opposite ends of both the comb members 17 and 18 and the dam elements 19 and 20 (FIGURE 5). The comb members 17 and 18, which are substantially flat, elongated and rectangular in shape, have opposing teeth 49 between which the lugs 51 of the battery plates 41 are snugly, but slidably, receivable. Said comb members may be substantially identical in structure to the comb structures disclosed and claimed in the patent application Serial No. 535,938. Thus, further detailed description of the comb members 17 and 18 is believed unnecessary for the purposes of disclosing the invention herein claimed.

The dam elements 19 and 20 (FIGURE 3), which are substantially flat, elongated and rectangular, are provided with terminal post recesses 52 which receive terminal posts 53 and cooperate with the comb members 17 (FIGURE 7) to control the molten metal during the fusing operation. Insofar as their structure for cooperation with the comb members 17 and 18 is concerned, said dam elements may be substantially identical to those disclosed and described in patent application Serial No. 535,938.

A pair of pivot shafts 55 and 56 (FIGURES 1 and 3) are mounted, respectively, upon the front and rear comb members 17 and 18 by means of the shaft supports 57, said shafts 55 and 56 extending at both ends substantially beyond the end walls 11 and 12 (FIGURE 3). The rightward ends of said shafts 55 and 56 are slidably received into slots 63 and 64 in the upper edges of the pivot plates 58 and 59, respectively, which are pivotally mounted upon the rightward end wall 11 of the frame structure 10 by means of the pivot bolts 65 and 66, respectively. Said pivot plates 58 and 59 are part of the right end portion 61 (FIGURE 3) of the actuating mechanism 21, which operates the comb members 17 and 18, and the dam elements 19 and 20. The actuating mechanism 21 includes a left end portion 62 which is located at the leftward end of the frame structure, and is an identical counterpart of said end portion 61 in this particular embodiment. Thus, the right end portion 61 of the actuating mechanism 21 will be described in detail and such will be understood to apply to the left end portion 62 of the actuating mechanism as well. Parts of the left end portion 62, where numbered, will carry the same numerals used in the right end portion 61 with the suffix "a".

The pivot plates 58 and 59 (FIGURES 1 and 2), which are spaced from each other, are interconnected by means of the adjustable connecting rod 67 so that pivoting of the front pivot plate 58 will effect a corresponding pivoting of the rear pivot plate 59 in the opposite rotational direction. Thus, due to the connection between the pivot plates 58 and 59, the pivot shafts 55 and 56 and the comb members 17 and 18, pivoting of the front pivot plate 58 in a counterclockwise direction, as appearing in FIGURES 1 and 2, results in simultaneous movement of said comb members away from each other, and clockwise movement of said front pivot plate 58 effects simultaneous movement of said comb members toward each other.

An actuating arm 68 (FIGURES 1, 2 and 3) extends from the pivot plate 58 frontwardly of the frame structure 10 and pivotally engages a locking arm 69 between the ends thereof. A locking finger 70 is secured to, and extends downwardly from, said locking arm near its pivot point. The locking finger 70, shown in broken lines at 71 in FIGURE 1, is engageable at its lower end with a locking block 72, mounted upon an adjacent portion of the right end wall 11. Disengagement of the locking finger 70 from the locking block 72, thereby moving the locking finger from its solid line position to its broken line position in FIGURE 1, is effected by pivoting the front end of the locking arm 69 toward the actuating arm 68 against the contrary urging of the spring 73 which is connected under tension between the lower end of the locking finger 70 and the front end of the actuating arm 68.

An adjustment bolt 74 (FIGURE 1) is secured to the rearward end of the locking arm 69 for engagement with the actuating arms 68, thereby controlling the frontward urging of the finger 70 by the spring 73. The locking arm 69 is connected to its counterpart on the left end portion 62 of the actuating mechanism 21 by means of an angle bar 75 (FIGURE 3). In a similar manner, the actuating arm 68 is connected to its counterpart in the left end portion 62 of the actuating mechanism 21 by means of a rod 76. Thus, the right and left portions 61 and 62 of the actuating mechanism 21 are simultaneously operated by appropriate movement of the angle bar 75 and rod 76.

Since the actuating mechanism 21 is connected by means of the end portions 61 and 62 thereof to the comb members 17 and 18, downward urging of the bar 75 and rod 76 will effect an outward movement of the comb members 17 and 18, and upward urging will produce an opposite movement of said members. This arrangement is similar to that described and disclosed in the patent application Serial No. 275,357.

An actuating bar 79 (FIGURES 1 and 3), which is also part of the end portion 61 of the mechanism 21, is secured at its front end upon the front pivot shaft 55 outwardly of the pivot plate 58, and extends rearwardly therefrom where it is slidably supported upon a slide block 80 mounted upon the outer surface of the right end wall 11 near the upper edge thereof. A set screw 81 prevents rotation of the actuating bar 79 with respect to the pivot shaft 55. The rightward end of the rear dam element 20 extends across the right guide rail 47 and the actuating bar 79. A pair of pins 82 and 83 extend upwardly from the actuating bar 79 on the front and rear sides of the rear dam element 20. Thus, frontward or rearward movement of the actuating bar 79, acting through the pins 82 and 83, results in corresponding movement of the rear dam element 20. The rear dam element 20 has a notch 84 (FIGURE 3) in its right front corner, into which the front pin 82 is received when the front and rear dam elements are adjacent to each other.

A rear actuating bar 85 (FIGURES 1, 3 and 4) is mounted upon the rear pivot shaft 56 and held fixed with respect thereto by a set screw 86, said bar 85 being disposed outwardly of the front actuating bar 79. The rear dam element 20 (FIGURE 3) also extends across the rear actuating bar 85 where it is secured, as by welding, to a guide bar 87 slidably disposed adjacent to the outer surface of the rear actuating bar 85. A guide strip 88, which is secured to, and transversely of, the lower surface of the guide bar 87 between the ends of both, extends beneath the actuating bar 85, thereby limiting the downward movement of the actuating bar 85 and preventing disengagement of the rear dam element 20 from said rear actuating bar 85.

The frontward end of the actuating bar 85 (FIGURES 1, 2 and 3) has an upwardly extending boss 89 having a substantially horizontal, transverse opening 91, which is elongated in the forward and rearward directions. The rightward end of the front dam element 19, which element extends across the right guide rail 47 and front actuating bar 79, is provided with an integral pivot pin 92, which extends through and is rotatable within the opening 91. Said pivot pin 92 is adjacent to the frontward edge of the front dam element 19. A cam follower 93, having an upwardly and rearwardly sloping cam follower surface 94, is mounted upon, and extends rearwardly from, the rightward end of the front dam element 19 directly above the front actuating bar 79 and in line with the front pin 82 on said front actuating bar 79. Said front pin 82 is provided with an upwardly and rearwardly sloping cam surface 95 engageable by the follower surface 94 when said follower 93 and pin 82 are moved toward each other. Due to the pivotal support of the front dam element 19, said engagement of the follower 93 with the pin 82 effects a pivotal movement of said front dam element 19 about the pivot pin 92 through an arc of about 90 degrees from the horizontal position shown in FIGURE 1 to the vertical position shown in FIGURE 2. The pivot stop 96 (FIGURES 1 and 2) mounted on the upper surface of the boss 89 limits the pivotal movement of the front dam element 19 to a substantially vertical position.

A leaf spring 97 (FIGURE 1) is secured at its front end to the lower surface of the rear actuating bar 85 near the front end thereof and extends rearwardly along said actuating bar 85 for releasably gripping that portion of the strip 88 which extends under the rear actuating bar 85, as shown in FIGURE 2. When the rear actuating bar 85 is pivoted upwardly and rearwardly (FIGURE 4) about the axis of the rear pivot shaft 56, the leaf spring 97 will prevent gravity from moving the rear dam element 20 downwardly along the rear actuating bar 85. Thus, when the bar 85 is pivoted downwardly and forwardly into its horizontal position (FIGURE 2), the rear dam element will automatically return to its position between the pins 82 and 83, providing the position of the actuating mechanism 21 is the same as it was when the bar 85 was raised.

A leaf spring 98 is mounted upon the forward end of the right guide rail 47 for slidably engaging and urging the front dam element 19 into its horizontal position when the said front dam element is moved frontwardly by the rear actuating bar 85. The lift mechanism 22 comprises the rear actuating bar 85, its counterpart at the leftward end of the frame structure 10 and the parts mounted on and associated with said actuating bar 85. A stop pin 99 extending rightwardly from the rear pivot plate 59 is engageable by the rear actuating bar 85 for limiting the rearward pivotal movement thereof.

The structure disclosed in FIGURES 1, 2, 3 and 4 with respect to the dam elements 19 and 20, is especially designed for use under circumstances where battery plates of relatively small width are being burned and, therefore, a minimum of distance is available between the terminal posts indicated in broken lines at 53 in FIGURE 2. However, where battery groups utilizing larger battery plates are being burned in the fixture disclosed herein, then the flip-up arrangement of the front dam element 19 may be unnecessary so that dam elements such as those shown in the alternate structure 105 of FIGURES 8 through 11 may be utilized without sacrificing any structural strength in the dam elements.

*Alternate structure*

As shown in FIGURE 8, which represents a fragment of a top plan view similar to that shown in FIGURE 3, the front actuating bar 106 is provided with a pair of spaced upstanding pins 107 and 108 which are disposed on opposite sides of the adjacent end of the rear dam element 109. The end of the rear dam element 109 is offset rearwardly to provide a notch 114 into which the front pin 107 is received when the dam elements are adjacent to each other as shown in FIGURES 8 and 9. The front dam element 110 is secured to the forward end of the rear actuating bar 111 in any suitable manner, as by welding. A slide bar 112 is secured to the lower surface of the rear dam element 109 adjacent to its rightward end for slidably engaging the outer surface of the rear actuating bar 111. A positioning strip 113 is secured to, and extends from, the guide bar 112 under the rear actuating bar 111 for preventing disengagement therefrom of the rear dam element 109. A leaf spring 115 is secured to the lower surface of the rear actuating bar 111 for engaging the positioning strip 113 and thereby releasably holding the rear dam element 109 adjacent to the front dam element 110. The rear actuating bar 111 is mounted upon a rear pivot shaft 116 for pivotal movement about the axis thereof, thereby raising both the front dam element 110 and rear dam element 109. However, the front dam element 110 cannot be moved into a vertical position, since it is securely mounted upon the frontward end of the rear actuating bar 111. The leaf spring 115 serves the same purpose as the leaf spring 97.

*Operation*

Figure 7:
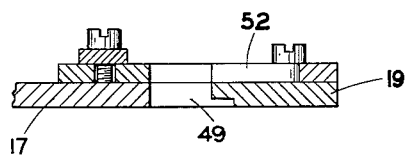
FIGURE 7 is a sectional view taken along the line VII—VII of FIGURE 3, but showing the dam and comb in closed position.

In order to use the group burning fixture shown in FIGURES 1, 3 and 5, it must first be opened and loaded with battery plates. If the fixture parts are in the positions as shown in solid lines in FIGURE 1, each pair of cooperating comb members and dam elements 17 and 18 and 19 and 20, respectively, will be disposed as shown in FIGURE 7 with respect to the front comb member 17 and front dam element 19. Thus, the first step in opening the burning fixture is to depress the angle bar 75 (FIGURE 3) thereby depressing the front ends of the locking arms 69 and 69a whereby the locking finger 70 (FIGURE 1) will be moved from its solid line position to its released or broken line position 71. Continued depression of the angle bar 75 will cause it to engage the rod 76 whereby the frontward ends of the actuating arms 68 and 68a will be pivoted downwardly about the pivot bolts 65. This will cause the pivot plates 58 and 59 (FIGURE 2) in the right portion 61, plates 58a and 59a in the left portion 62 (FIGURE 3), of the actuating mechanism 21 to move the pivot shafts 55 and 56 outwardly away from each other. Since the rear shaft 56 (FIGURE 3) is mounted upon the rear comb member 18 by the supports 57, and connected to the front dam element 19 by the rear actuating bars 85 and 85a, such outward movement of the rear shaft 56 will effect a rearward movement of both the front dam element and rear comb member. Likewise, the front shaft 55 is mounted upon the front comb member 17 by the supports 57 and connected to the rear dam element 20 by the front actuating bars 79 and 79a. Thus, outward movement of the shaft 55 will cause the front comb member 17 and rear dam element 20 to move forwardly.

The front dam element 19 (FIGURES 1, 2 and 3) is moved rearwardly by the rear actuating bars 85 and 85a, whereas the rear dam element 20 is moved forwardly by the pins 83 and 83a on the front actuating bar 79 and 79a, respectively. As the front dam element 19 approaches the rear dam element 20, the surface on the cam followers 93 and 93a (FIGURE 3) will engage the cam surfaces 95 and 95a on the front pins 82 and 82a thereby causing the front dam element 19 to rotate in a counterclockwise direction, as appearing in FIGURE 1, about the axis of the pivot pins 92 and 92a. When the fixture, and actuating mechanism 21 associated therewith, reach the position approximately as shown in FIGURE 2, the leaf spring 97 on the rear actuating bar 85 will engage the positioning strip 88 (FIGURES 2 and 4) thereby releasably resisting movement of the rear dam element 20 in a rearward direction. Both the front and rear dam elements can now be easily and quickly raised by manually lifting rear actuating bars 85 and 85a upwardly and thereby pivoting same rearwardly about the axis of the rear pivot shaft 56 until they reach the position shown in FIGURE 4. The downward movement of the angle bar 75 and rod 76 operating through the actuating mechanism 21 will also have moved the comb members 17 and 18 out of a position obstructing the open upper side of the plate chamber 16. Thus, the group compartment 31 in the plate chamber 16 can now be quickly and easily loaded with battery plates in group quantities by an operator standing in front of the fixture.

The comb members 17 and 18 (FIGURE 3) can, if desired, be properly adjusted in a manner described in detail in the application Serial No. 535,938 to handle the desired number of battery plates. The movable partition members 34 (FIGURES 5 and 6) can be adjusted to correspond to the position of the exposed teeth 49 in the comb members 17 and 18 by adjusting the handles 44 and 45 which move the intermediate plates 30 in the front and rear walls 13 and 14.

The operator now manually pivots the lift mechanism 22 about the axis of shaft 56 from its FIGURE 4 position back into its FIGURE 2 position. He then grasps the rod 76 and lifts upwardly on it until the dam elements 19 and 20 again engage the corresponding comb members 17 and 18, as shown in FIGURES 1 and 7. The fusing operation is now conducted on the lugs 51 of the battery plates 41 in the usual manner. When the fusing operation has reached a stage where the battery group can be removed from the plate chamber 16, the operator again pushes downwardly on the angle bar 75 which moves the dam elements 19 and 20 toward each other and out from under the terminal posts 53 (FIGURE 2) while at the same time withdrawing the comb members 17 and 18 away from positions obstructing the open, upper side of the plate chamber 16. The rear actuating bars 85 and 85a are again pivoted upwardly into their FIGURE 4 position and the burned, battery plate groups are quickly and easily lifted out of the plate chamber 16. This completes a cycle of operation of the group burning fixture, which cycle can be repeated by again loading the plate chamber, lowering the lift mechanism 22, raising the rod 76 of the actuating mechanism 21, fusing the battery lugs, depressing the angle bar 75 and again raising the lift mechanism 22.

The leaf springs 98 and 98a on the guide rails 47 and 48 cooperate with the front pins 82 and 82a to return the front dam element 19 to its horizontal position as the rear actuating bars 85 and 85a move said front dam element 19 forwardly. Said leaf springs 98 and 98a also hold the front dam element 19 in the horizontal position during the fusing operation. The positioning strips 88 and 88a serve to held the rear dam element 20 in the horizontal position during the fusing operation.

The leaf springs 35 and associated spiral springs 37 on each pair of movable partition members 34 resiliently urge the battery plates 41 against the opposing surfaces of the fixed partition members 32. The amount of such urging can be easily adjusted by turning the handles 44 and 45 which, in turn, control the movement of the slide plates 31 and the movable partitions 34 secured thereto.

The alternate structure shown in FIGURES 8 through 11, inclusive, operates in substantially the same manner as the structure disclosed in FIGURES 1 through 4, inclusive. The major difference between the two structures resides in the fact that the front dam element 110 is rigidly secured upon the rear actuating bar 111 and cannot be moved up into a vertical position like the front dam element 19. Thus, said alternate structure is better suited to use in burning the larger battery plates where the terminal posts 53 are spaced far enough apart to permit the use of dam elements which are sufficiently wide to be adequately strong.

Although the above mentioned drawings and corresponding description refer to particular, preferred embodiments of our invention, it will be understood that other modifications or variations of the invention which lie within the scope of such disclosure are fully contemplated unless specifically stated to the contrary in the appended claims.

We claim:
1. In an apparatus for fusing together the lugs of battery plates, said apparatus having a frame defining a battery plate receiving zone and a pair of combs respectively positioned above the respective sides of said zone and movable transversely thereof toward and away from each other, the improvement which comprises a pair of dam elements positioned above said zone between said combs and cooperable therewith to limit flow of molten metal during the fusion operation, said dam elements being supported for sliding movement toward and away from each other; means for moving said dam elements toward and away from each other; and lift means including a pair of arms mounted on said frame for pivotal movement about an axis adjacent one side of said zone for simultaneously moving both of said dam elements when adjacent each other in the same direction about said axis so that both of said elements are moved toward a position adjacent said one side of said zone.

2. In an apparatus for fusing together the lugs of battery plates, said apparatus having a frame defining a battery plate receiving zone and a pair of combs respectively positioned above the respective sides of said zone and movable transversely thereof toward and away from each other, the improvement which comprises a pair of dam elements positioned above said zone between said combs and cooperable therewith to limit flow of molten metal during the fusing operation; a first pair of bars located respectively adjacent the opposite ends of said zone and means adjacent one side of said zone for moving said first pair of bars transversely with respect to said zone; means on said first pair of bars for engaging and moving one of said dam elements transversely in response to transverse movement of said first pair of bars, said last-named means permitting upward movement of said one dam element with respect thereto; a second pair of bars located respectively adjacent the opposite ends of said zone and means adjacent the other side of said zone for moving the second pair of bars transversely with respect to said zone; means securing the other of said dam elements to said second pair of bars, said second pair of bars being located below said one dam element and being engageable therewith upon upward movement thereof; and means supporting said second pair of bars for pivotal movement about an axis adjacent said other side of said zone so that said second pair of bars upon upward pivotal movement thereof simultaneously engage both of said dam elements and move same upwardly and toward said other side of said zone.

3. An apparatus as defined in claim 2 wherein said means on said first pair of bars for moving said one of said dam elements includes a pair of transversely spaced pins on each bar, said one dam element being loosely received between said pins and being movable upwardly with respect thereto in order to clear said pins.

4. An apparatus as defined in claim 3 wherein said other dam element is pivotally connected to said second pair of bars; cam follower means on said other dam element; the pins on said first pair of bars adjacent said one dam element having cams formed thereon and engageable with said cam follower means to move said other dam element to a vertical position when said dam members are moved toward each other.

5. An apparatus as defined in claim 2 including latch means secured to said second pair of bars and cooperating means on said one dam element engageable with said latch means for locking said one dam element to said second pair of bars to prevent relative movement therebetween.

6. An apparatus as defined in claim 5 wherein said latch means includes a leaf spring secured at one end thereof to each one of said second pair of bars, the other end of said spring extending toward said other side of said zone; and said cooperating means includes a pair of blocks secured to said one dam element, each of said blocks being engageable by one of said leaf springs for being releasably held thereby.

References Cited in the file of this patent

UNITED STATES PATENTS

| | | |
|---|---|---|
| 1,215,206 | Shannon | Feb. 6, 1917 |
| 2,505,514 | Anderson | Apr. 25, 1950 |
| 2,516,546 | Brown | July 25, 1950 |
| 2,662,433 | Braun | Dec. 15, 1953 |
| 2,745,367 | Tiegel | May 15, 1956 |
| 2,756,708 | Tiegel | July 31, 1956 |
| 2,759,445 | Winkel | Aug. 21, 1956 |
| 2,786,433 | Vieth | Mar. 27, 1957 |
| 2,808,800 | Winkel | Oct. 8, 1957 |

FOREIGN PATENTS

| | | |
|---|---|---|
| 297,606 | Germany | May 3, 1917 |